United States Patent [19]
Au

[11] 4,206,023
[45] Jun. 3, 1980

[54] ZINC RECOVERY BY CHLORINATION LEACH

[75] Inventor: Robert W. Au, Diamond Bar, Calif.

[73] Assignee: Occidental Research Corporation, La Verne, Calif.

[21] Appl. No.: 905,128

[22] Filed: May 12, 1978

[51] Int. Cl.² .................... C25C 1/16; C22B 19/22; C01G 9/04
[52] U.S. Cl. ........................... 204/118 JM; 75/104; 75/120; 423/109
[58] Field of Search ............. 423/101, 103, 109, 110; 75/104, 120; 204/118

[56] References Cited
U.S. PATENT DOCUMENTS

| 921,312 | 5/1909 | Thwaites | 423/104 |
|---|---|---|---|
| 1,838,857 | 12/1931 | Mitchell | 75/120 |
| 3,998,628 | 12/1976 | Gandon | 423/40 |

FOREIGN PATENT DOCUMENTS 2323154 11/1973 Fed. Rep. of Germany ........... 423/109

*Primary Examiner*—Brian E. Hearn
*Attorney, Agent, or Firm*—Christie, Parker & Hale

[57] ABSTRACT

A process is disclosed for the separation and recovery of zinc from material in which it is contained as a sulfide. Zinc sulfide containing material is chlorinated in an aqueous medium in the presence of elemental chlorine and ferric/ferrous ions to form a solution containing zinc chloride, iron chloride and elemental sulfur. The solution is treated with elemental chlorine and alkali to precipitate the iron (e.g. at about pH 3 to 4). Zinc chloride is recovered from the solution by means known to those skilled in the art such as by electrolysis. The precipitated iron is recycled for use as a secondary chlorinating solution to treat the solid residue of the initial chlorination leaching step.

4 Claims, 2 Drawing Figures

ZINC RECOVERY BY CHLORINATION LEACH

BACKGROUND OF THE INVENTION

Zinc occurs commonly in nature as a sulfide intermixed with compounds of other metals. Various methods have been used in the past for obtaining zinc metals from such zinc ores. Zinc has been recovered by chlorination leaching of zinc containing ore by methods such as those taught in U.S. Pat. Nos. 1,736,659 and 1,838,857 to Mitchell, and 3,973,945 to Goens et al.

U.S. Pat. Nos. 1,736,659 and 1,838,857 of Mitchell disclose processes for the separation of metals from thin ores by chlorination leaching using $CaCl_2$ and $FeCl_3$ as the chlorinating agents with some chlorine being supplied by recycled chlorine. A problem presented in the processes of Mitchell is that the processes can start with iron sulfide present and when operated with iron chloride do not effectively remove the sulfur from the iron sulfide. The only method presented in the Mitchell processes for preventing further production of iron sulfide by the reaction of the free sulfur released from zinc is by maintaining strict control of the temperature at which the chlorination leaching is conducted.

U.S. Pat. No. 3,973,945 of Goens et al discloses a process for the removal of zinc from a zinc sulfide material using chlorination leaching in the presence of ferric ions. The process also discloses an iron cementation step for removing additional metal ions (other than zinc) present following chlorination and more importantly the conversion of the iron present in solution to the ferrous state. The iron must be in the ferrous state for the subsequent step of extracting the zinc from the solution. In the extraction step, the zinc chloride is extracted from the aqueous solution containing ferrous ions with an organic extractant such as a trialkylphosphate and tertiary amine. A problem with the process of Goens et al is that iron is necessarily added for the iron cementation step and a step must thereafter be added to the process for the removal of this iron to avoid contamination of the zinc product.

SUMMARY OF THE INVENTION

In accordance with this invention there is disclosed a process for the separation and recovery of zinc from materials in which it is contained as a sulfide. The zinc sulfide containing material is substantially chlorinated in an aqueous medium in the presence of elemental chlorine and ferric/ferrous ions to form a solution containing zinc chloride and elemental sulfur. The zinc is recovered from solution by separating the solution from the solid residue. The solution is treated with elemental chlorine and alkali to provide a pH of about 3 to about 4 to precipitate the iron present as ferric hydroxide which is separated from the solution. The zinc chloride is recovered from the solution by any convenient means, many of which are known to those skilled in the art, such as by electrolysis. The iron is recycled for use in an additional leaching step by dissolving the ferric hydroxide in an acidic medium. The acidic solution containing ferric ions is recycled as a secondary chlorinating solution for the solid residue of the initial chlorination leaching step. The resulting solution from the secondary leaching is recycled to an initial chlorination step of untreated zinc sulfide containing material.

DETAILED DESCRIPTION OF THE INVENTION

Figure 1:
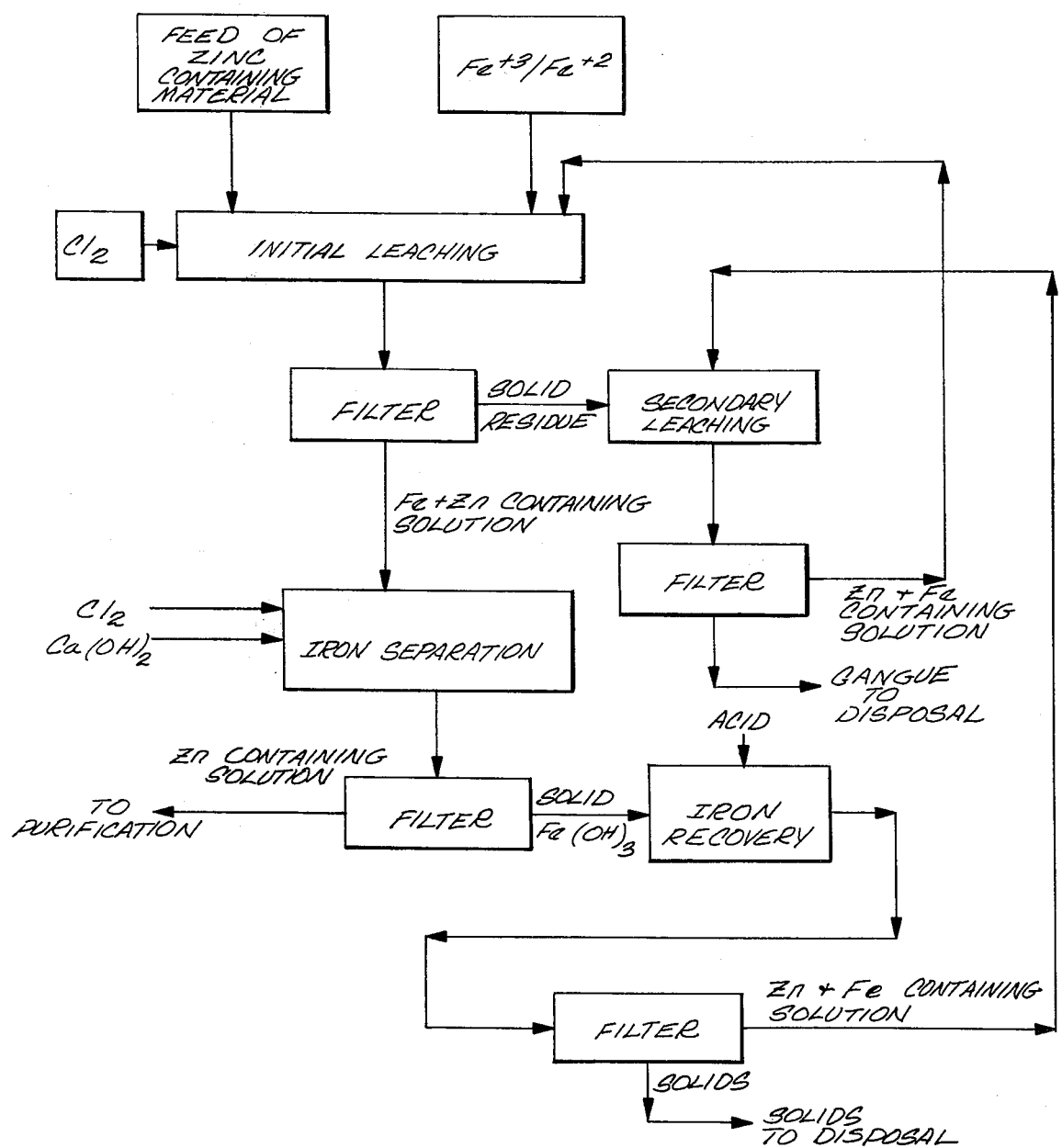
FIG. 1 is a flow diagram of the process of the invention wherein a secondary chlorinating solution is recycled.
Figure 2:
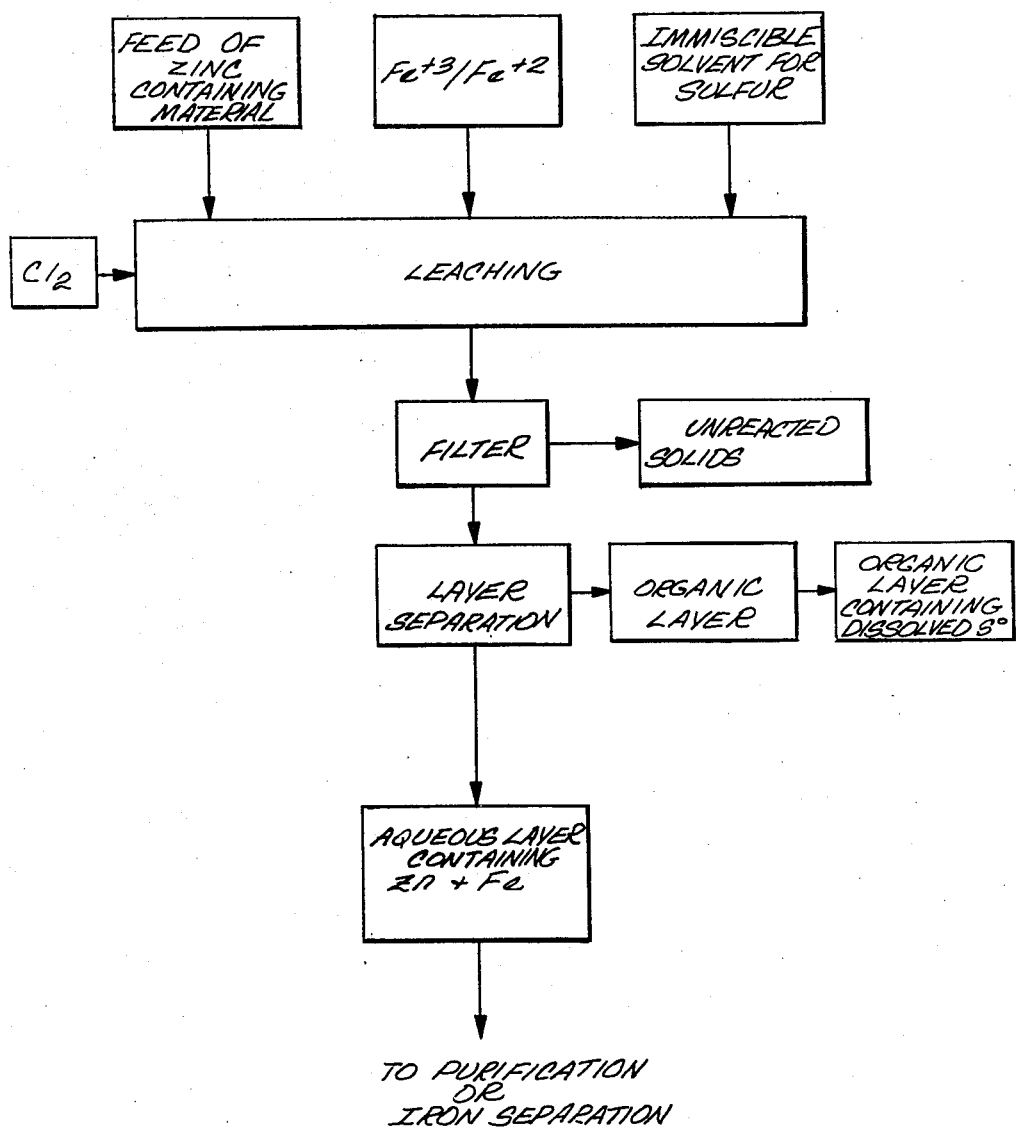
FIG. 2 is a flow diagram of the process of the invention wherein an inert, immiscible solvent is used to dissolve the elemental sulfur formed.

In order to facilitate the understanding of the present invention, reference will be made to the accompanying drawings which are a flow diagram of the process of this invention. FIG. 1 depicts the process for recovery of zinc wherein a secondary chlorinating solution is recycled. FIG. 2 depicts an alternate initial chlorine leaching step wherein an inert, immiscible solvent for elemental sulfur is added to remove the sulfur formed during leaching. Following layer separation in FIG. 2, the solution containing Zn and Fe can be processed to recover iron therefrom for recycle in the manner as shown in FIG. 1.

The process of the present invention can be used to recover zinc from a zinc sulfide containing material such as a zinc ore or a float concentrate. The zinc containing material, such as zinc ore or float concentrate, is slurried in water. To the aqueous slurry is added ferric chloride as a source of ferric and ferrous ions. The metal ions serve as a chlorine carrier. Additionally, chlorine gas is used to regenerate the ferric ion to react further with the zinc sulfide containing ore or float concentrate. The overall reaction is best represented by the following equations:

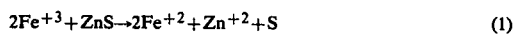
$$2Fe^{+3} + ZnS \rightarrow 2Fe^{+2} + Zn^{+2} + S \quad (1)$$

$$2Fe^{+2} + Cl_2 \rightarrow 2Fe^{+3} + 2Cl^{-1} \quad (2)$$

$$ZnS + Cl_2 \rightarrow ZnCl_2 + S \quad (3)$$

Equation (3) is the combination of equations (1) and (2) which indicates that zinc sulfide and chlorine gas are reactants and the products are zinc chloride and elemental sulfur. The iron acts as a transfer agent for the chlorine.

The regeneration of the ferric ions in the leaching solution by bubbling chlorine gas therethrough reduces the amount of ferric ions required to react with the zinc sulfide in the slurry. The amount of ferric ions required initially, therefore, is less than a stoichiometric amount in relation to the zinc sulfide present in the ore or concentrate. The concentration of ferric ions added initially can vary, due to such regeneration, from about 5 g/l to substantially a molar stoichiometric amount to the sulfide sulfur present. It is preferred to use the minimum amount of ferric ions, as any iron present in the slurry must be subsequenty removed prior to the recovery of the zinc. A preferred amount of iron to be added initially to the zinc slurry is from about 15% to about 30% by weight of the amount required to be stoichiometric to the sulfur in the ore or float concentrate as is generally depicted by the following equation:

$$2Fe^{+3} + S^{-2} \rightarrow 2Fe^{+2} + S^0 \quad (4)$$

The source of the ferric ions can be any convenient iron containing compound which is soluble in the slurry of ore or float concentrate such as soluble iron salts and the like. Preferably ferric chloride is selected, as such compound provides both iron and chloride ions.

The aqueous slurry of ore or float concentrate containing ferric ions is heated to a temperature of from about ambient to about the boiling point of the slurry. Preferably the slurry is heated to a temperature of from about 80° to about 110° C. The slurry is agitated and chlorine is introduced beneath the surface of the slurry. The chlorine is introduced as chlorine gas which is bubbled through the slurry at a rate sufficient to oxidize the ferrous ions to ferric ions which ferric ions are concomitantly being reduced to ferrous ions by the sulfide sulfur in the ore or float concentrate (equation 4). The chlorine addition is terminated when from about 75% to about 90% of the zinc present in the initial feed material has been extracted.

To the aqueous slurry of ore or float concentrate can be added a water immiscible solvent for sulfur (FIG. 2), preferably inert. The solvent dissolves the elemental sulfur as it is formed during the reaction of the zinc sulfide material with the ferric/ferrous ions. It has been found that sulfur formed during chlorination leaching tends to coat zinc sulfide material in the slurry. Thus, potential particles from which zinc can be leached are further coated by the sulfur formed and it becomes more difficult to recover the zinc from these particles. The efficiency of the chlorination leaching correspondingly decreases. By removing the sulfur as it is formed there is provided substantially more reactive sites for the ferric ions than when the sulfur is not removed and coats the surface of the ore particles. Further, the removal of the sulfur from the aqueous medium into the immiscible solvent reduces the formation of free acid which generally forms from a reaction of the sulfur and chlorine.

The immiscible solvent employed in the aqueous slurry to absorb and dissolve the sulfur formed can be any convenient solvent for sulfur that is compatible with the chlorination leaching process. Generally such a solvent will be an organic solvent that is stable toward the chlorine and ferric/ferrous ions present. Preferred organic solvents are solvents which have a high affinity towards elemental sulfur and which have a sufficiently distinct density from water to facilitate good phase separation. The volume of solvent will depend on the amount of sulfide sulfur in the slurry and the solubility of the sulfur in the solvent. A volume is preferred that will substantially absorb and dissolve all of the sulfur generated during the chlorination leaching process. A particularly preferred solvent that is inert to substantially all the material present in the slurry, readily dissolves the sulfur formed and is easily separated from the aqueous slurry, is 1,1,2,2-tetrachloroethane.

The water immiscible solvent is added to the aqueous slurry containing the zinc sulfide ore or float concentrate. A source of ferric iron ions is also added and the aqueous slurry is heated from about ambient temperature to about the boiling point of the slurry as described herein above. Chlorine gas is introduced into the slurry from below at a rate sufficient to oxidize the ferrous ions to ferric ions which are being reduced to ferrous ions by the sulfide sulfur in the ore.

Following the addition of the chlorine gas to the slurry, the resulting mass is filtered and the solid residue separated from the aqueous solution (FIG. 1). The residue substantially contains elemental sulfur formed during the chlorination, some unreacted zinc sulfide material, insoluble minerals in the ore and other insoluble matter. If a water immiscible solvent for sulfur is employed, the residue would not contain any appreciable amount of sulfur. When such a solvent for sulfur is utilized (FIG. 2), the filtrate from the reaction residue is allowed to separate into an aqueous and organic layer. The two layers are separated. The organic layer contains dissolved sulfur formed during the reaction. The aqueous layer, containing zinc, ferric/ferrous and chloride ions is processed to recover the zinc in the same manner as if such a water immiscible solvent had not been employed.

The aqueous solution containing the leached zinc also contains dissolved ferric/ferrous ions. It is, therefore, advantageous to remove the iron from the solution and recycle it for use in an additional zinc leaching step upon either a solid residue generated in the initial chlorination leaching step (FIG. 1) or a new untreated ore or float concentrate (not shown). The removal of the iron also enhances the recoverability of zinc. The iron is removed from the solution by treating the solution with an alkali to provide a pH to the solution of about 3 to about 4 and thereby precipitate the iron as ferric hydroxide which is separated by any convenient manner such as by filtration. A preferred alkali used to precipitate the iron is calcium hydroxide. The recovered solution containing zinc can be treated to recover the zinc therefrom by any convenient method, many of such methods for recovering zinc from solution are known to those skilled in the art, such as by electrolysis.

The precipitated ferric hydroxide can be dissolved in aqueous acid such as hydrochloridic acid, sulfuric acid, nitric acid and the like to form a secondary chlorinating solution. Hydrochloric acid is preferred over nitric acid or sulfuric acid because nitrate or sulfate ions must be removed prior to the later electrolysis step. This secondary chlorinating solution can be added to the solid residue recovered from the initial chlorination leaching step. The secondary chlorinating solution containing ferric ions reacts with the unreacted zinc sulfide in the solid residue to leach and solubilize substantially all of the zinc remaining in the solid residue. If an acid other than hydrochloric acid is used, chlorine gas can be bubbled through the mixture of solid residue and aqueous acidic ferric ions for providing the necessary chlorine ions to leach the zinc from the solid residue. Following the secondary chlorination leaching of the solid residue the mixture is filtered. The solid material remaining is gangue, containing substantially sulfur and other insoluble material. The solution recovered containing zinc and iron is recycled and added to an aqueous slurry feed of zinc sulfide ore or float concentrate in an initial chlorination leaching step.

The invention is further illustrated by the following examples which are not intended to be limiting.

EXAMPLE 1

An aqueous slurry was prepared by combining 200 parts by weight (pbw) of a 12% by weight aqueous solution of ferric chloride at 90° C. with 100 pbw of a float concentrate containing about 54% by weight zinc. The temperature of the slurry was maintained at 90° C. by using a heating mantle controlled by a thermistor. A mechanical stirrer was used to agitate the slurry at about 650 rpms. Chlorine gas was introduced beneath the surface of the slurry at a rate of about 0.3 of one part by weight per minute for a period of about 200 minutes. The total amount of chlorine added was about 60 pbw. At the end of the addition of chlorine gas the resulting mass was filtered while still hot. The solid residue obtained thereby was washed with 100 pbw water. The recovered filtrate contained zinc ions, chloride ions, and ferric/ferrous ions.

The ferrous ions that had been present in the leaching solution had been converted to ferric ions by the chlorine. The ferric ions in the filtrate were precipitated out of solution as ferric hydroxide by the addition of calcium hydroxide. The resulting mixture was filtered and the solid ferric hydroxide separated from the zinc containing solution. Hydrochloric acid was added to the ferric hydroxide to redissolve the ferric hydroxide. The resulting solution containing ferric ions was recycled and combined with the solid residue and the partially reacted ore or float concentrate of the initial chlorination leaching step. The ferric ion containing solution acted as a secondary leaching solution and leached additional zinc from the solid residue and partially reacted ore. Following chlorination the mixture was filtered. The solid material was discarded as gangue, the filtrate containing zinc and ferrous/ferric ions was recycled to an initial chlorination leaching step on an untreated zinc sulfide containing ore or float concentrate.

EXAMPLE 2

An aqueous slurry was prepared by combining 150 pbw of a 10% by weight aqueous, ferric chloride solution, 160 pbw of 1,1,2,2-tetrachloroethane and 100 pbw of a float concentrate containing zinc sulfide. The temperature of the slurry was maintained at 60° C. Chlorine gas was introduced from below the slurry at a rate of about 0.6 to one part by weight per minute for about 100 minutes. The total amount of chlorine added was about 60 pbw. Following chlorination leaching the resulting mass was filtered and washed. The filtrate was placed into a separatory funnel and the layers were allowed to separate. The organic layer was separated from the aqueous layer. The total aqueous layer consisting of the combined filtrate and wash, contained 47.5 pbw zinc. The organic layer contained substantially all of the sulfur.

The zinc was recovered from the aqueous solution of electrolysis. The amount of zinc recovered was 61% of the initial zinc present in the float concentrate.

What is claimed is:

1. A process for recovering zinc from material containing zinc sulfide which comprises:
   (a) partially chlorinating the zinc sulfide containing material in aqueous medium including recycle from step (h) in the presence of elemental chlorine and ferric chloride to form an aqueous solution containing zinc chloride, iron chloride, solid sulfur and partially chlorinated solid residue;
   (b) separating the aqueous solution from the solid residue;
   (c) treating the aqueous solution with elemental chlorine and an alkali to precipitate ferric hydroxide;
   (d) separating the ferric hydroxide from the aqueous solution;
   (e) recovering zinc from the aqueous solution;
   (f) dissolving the ferric hydroxide in an acidic medium to form a secondary leaching solution;
   (g) leaching additional zinc from the solid residue in the presence of the secondary leaching solution and chlorine to form a recycle solution containing zinc chloride and iron chloride; and
   (h) returning the recycle solution to step (a).

2. The process of claim 1 wherein the alkali is calcium hydroxide.

3. The process of claim 1 wherein alkali is added for providing a pH to the aqueous solution of about 3 to about 4 for precipitating ferric hydroxide.

4. The process of claim 1 wherein the acidic medium is an aqueous solution of an acid selected from the group consisting of hydrochloric acid, sulfuric acid and nitric acid.

* * * * *